No. 676,356. Patented June 11, 1901.
S. EBERT.
VALVE GRAB.
(Application filed June 17, 1899.)
(No Model.)

Witnesses  Samuel Ebert, Inventor
By his Attorneys,

THE NORRIS PETERS CO., PHOTO-LITHO., WASHINGTON, D. C.

UNITED STATES PATENT OFFICE.

SAMUEL EBERT, OF ROBERTS, ILLINOIS.

VALVE-GRAB.

SPECIFICATION forming part of Letters Patent No. 676,356, dated June 11, 1901.

Application filed June 17, 1899. Serial No. 720,941. (No model.)

*To all whom it may concern:*

Be it known that I, SAMUEL EBERT, a citizen of the United States, residing at Roberts, in the county of Ford and State of Illinois, have invented a new and useful Valve-Grab, of which the following is a specification.

This invention relates to valve-grabs; and it has for its object to provide a grab for removing valves from tubular wells, and particularly its object is to provide a construction by means of which the mud and sand that may have settled upon the valve may be washed away to permit the ready engagement of the grab with the valve.

Figure 1:
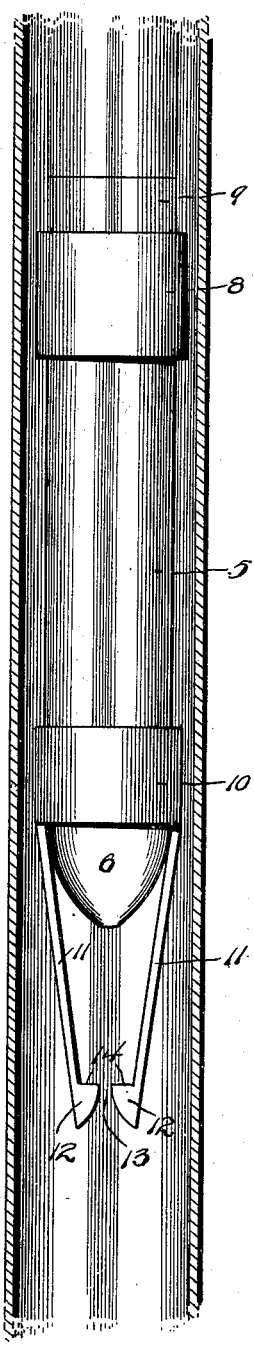
Figure 2:
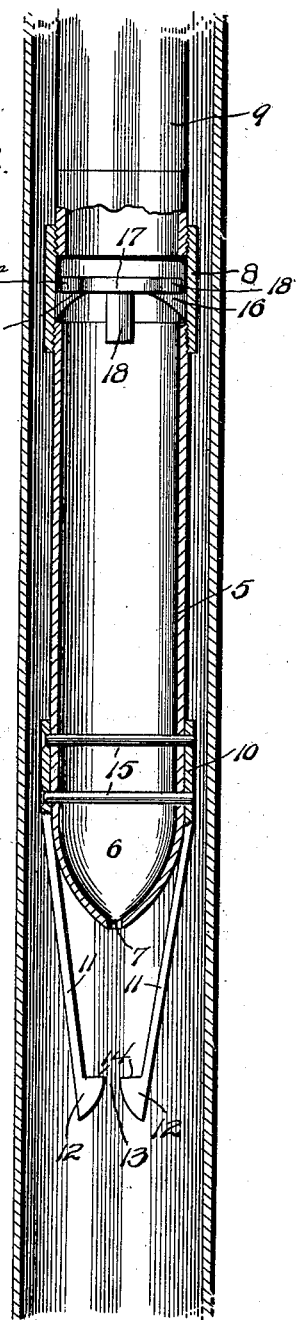

In the drawings forming a portion of this specification, and in which like numerals of reference indicate similar parts in the several views, Figure 1 is an elevation of the grab shown in connection with a well-casing, which latter is in section. Fig. 2 is a vertical section taken through the tube of the grab and through the well-casing, the gripping-fingers and the valve within the tube being shown in elevation.

Referring now to the drawings, the grab of the present invention comprises a pipe or tube 9, having a threaded lower end, and with this threaded portion is engaged a collar 8, in the opposite end of which is engaged a terminal tube 5, the lower end of which is drawn to a point, as shown at 6, and has an axial perforation 7. Upon the inner periphery of the collar 8 is formed a valve-seat 16, and upon this seat is disposed an upwardly-opening valve 18ª, which lies below the lower end of the pipe 9 and is limited in its upward movement thereby. By disengaging the pipe 9 from the collar 8 the valve may be removed for repair, replacing, or for any other purpose. Upon the terminal pipe 5 and adjacent the lower end thereof, above the tapered portion of the pipe, is a collar 10, at diametrically opposite points of which are secured or formed spring-fingers 11, which project beyond the tapered end of the pipe and lie convergingly. Upon the inner faces of the lower ends of the fingers 11 are lugs 12, the inner faces of which are curved inwardly and upwardly to form a converging opening 13, leading to the inclosure of the fingers. The upper faces of the lugs form shoulders 14 for a purpose which will be presently explained. The collar 10 may be held in place by any desired means, and in the drawings I have shown the employment of rivets 15 for this purpose, which are passed through the collar and nozzle.

When it is desired to remove a valve from a well in which sediment has deposited upon the valve, the pipes 9 and 5 are connected and lowered into the well until the fingers have about reached the bottom, where the valve is located. Water is then forced downwardly between the pipe 9 and the well-casing, and this water washes the sediment from the valve and forces it upwardly and through the opening 7 and into the pipes 5 and 9. The opening 7 being in the extremity of the tapered portion of pipe 5, the current is drawn inwardly and across the fingers and thus has a most effective action on the sediment. The grab may be then further lowered, and the fingers will snap over and into engagement with the valve. If the grab be then raised, the valve will be drawn from the well.

When it is desired to prevent the return of the water in the pipe 9 to the well and also the return of the sediment in such water, the valve 18ª is used; but where this is not desired the valve may be omitted, and as the grab is withdrawn the water in the tubes 5 and 9 will run back and into the well.

It will be thus seen that the apparatus may be used under different conditions with or without the valve.

It will of course be understood that in practice any suitable materials and proportions may be used for the structure and that modifications may be made without departing from the spirit of the invention.

What is claimed is—

1. In a valve-grab, the combination with a carrying-tube having its lower end tapered and provided with a perforation at the apex of the taper and in axial alinement with the tube, of gripping-arms carried by the tube and having jaws projecting beyond the perforated end of the tube for exposure to a stream of water passed outwardly of the tube through said perforation.

2. In a valve-grab, the combination with a carrying-tube having an opening for the passage of water, of gripping-arms upon the tube and lying at opposite sides of the axis of the opening and with their gripping portions beyond the opening.

3. In a valve-grab, the combination with a carrying-tube having an opening for the passage of water, of gripping-arms upon the tube and disposed with their gripping portions beyond the opening, whereby a current of water may be passed through the opening to set up a current over the gripping-arms, and an upwardly-opening valve in the carrying-tube.

4. In a valve-grab, the combination with a grappling device designed to engage the valve to effect its withdrawal, of means for effecting the removal of sand from above the valve to facilitate the engagement therewith of the grappling device.

5. A valve-grab comprising a tubular shank and exterior grappling means at the lower end of the shank, of a valve controlling the passage through the shank, and a coupling for effecting the attachment of a line of pipe to the upper end of the shank.

6. The combination with a nozzle having an inlet-opening and a discharge-opening, of fingers carried by the nozzle and having gripping portions disposed to lie in the water passed through the nozzle.

In testimony that I claim the foregoing as my own I have hereto affixed my signature in the presence of two witnesses.

SAMUEL EBERT.

Witnesses:
J. C. ZAHN,
WM. HURST.